(12) United States Patent
Brabbs et al.

(10) Patent No.: US 12,279,566 B2
(45) Date of Patent: Apr. 22, 2025

(54) EFFICIENT HYDROPONIC CULTIVATION SYSTEM AND METHOD

(71) Applicants: DUPONT SAFETY & CONSTRUCTION, INC., Wilmington, DE (US); PIONEER HI-BRED INTERNATIONAL, INC., Johnston, IA (US)

(72) Inventors: Noel Stephen Brabbs, Garnich (LU); Srinivas Cherukupalli, Telangana (IN); Narayan Pandurang Gaikwad, Indapur (IN); Virendra Gangaram Manjaramkar, Nanded (IN)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

(21) Appl. No.: 17/467,992

(22) Filed: Sep. 7, 2021

(65) Prior Publication Data
US 2023/0080202 A1 Mar. 16, 2023

(51) Int. Cl.
*A01G 31/06* (2006.01)

(52) U.S. Cl.
CPC .................... *A01G 31/06* (2013.01)

(58) Field of Classification Search
CPC ............. A01G 31/06; A01G 9/02; B65D 5/52
See application file for complete search history.

(56) References Cited

U.S. PATENT DOCUMENTS

| | | | |
|---|---|---|---|
| 3,667,157 A | | 6/1972 | Longhini |
| 3,822,504 A | | 7/1974 | Kuehn et al. |
| 3,877,172 A | | 4/1975 | Schwab et al. |
| 3,939,875 A | | 2/1976 | Osborn et al. |
| 3,996,968 A | * | 12/1976 | Bergman ............... A01G 25/06 138/128 |
| 4,037,362 A | | 7/1977 | Finck |
| 4,300,311 A | | 11/1981 | Marchant |
| 4,324,069 A | * | 4/1982 | Flagg ................... A01G 27/001 47/62 E |
| 4,392,328 A | * | 7/1983 | Walker .................. A01G 31/06 47/62 C |
| 4,454,684 A | * | 6/1984 | O'Hare .................. A01G 31/06 47/59 R |

(Continued)

FOREIGN PATENT DOCUMENTS

| | | |
|---|---|---|
| CN | 101416606 A | 4/2009 |
| CN | 101984784 A | 3/2011 |

(Continued)

*Primary Examiner* — Magdalena Topolski
*Assistant Examiner* — Katherine Anne Kloecker

(57) ABSTRACT

A hydroponic system and method for growing plants. The system comprises one or more plant support structures, one or more housing membranes, and one or more frames. The one or more plant support structures hold plant matter and have one or more holes. The one or more housing membranes are air-permeable and water-resistant, house a solution and at least a portion of the one or more plant support structures, and have one or more openings in which at least a portion of the one or more plant support structures fit into. The one or more frames support the one or more housing membranes. Methods for growing plants are also provided.

20 Claims, 6 Drawing Sheets

(56) References Cited

U.S. PATENT DOCUMENTS

| | | | |
|---|---|---|---|
| 4,783,342 A * | 11/1988 | Polovina | A01G 5/06 |
| | | | 427/4 |
| 4,860,490 A | 8/1989 | Morris et al. | |
| 4,926,585 A | 5/1990 | Dreschel | |
| 5,010,686 A | 4/1991 | Rivest | |
| 5,010,837 A | 4/1991 | Hirose | |
| 5,121,708 A | 6/1992 | Nuttle | |
| 5,224,291 A | 7/1993 | Sherfield | |
| 5,285,595 A | 2/1994 | Shirato | |
| 5,295,324 A | 3/1994 | Baba et al. | |
| 5,381,626 A | 1/1995 | Sherfield | |
| 5,525,505 A | 6/1996 | Young et al. | |
| 5,579,603 A | 12/1996 | Fukuzumi | |
| 5,588,256 A | 12/1996 | Sherfield | |
| 5,761,847 A | 6/1998 | Ito et al. | |
| 6,082,044 A | 7/2000 | Sherfield | |
| 6,216,390 B1 | 4/2001 | Peregrin | |
| 6,355,333 B1 * | 3/2002 | Waggoner | E04B 1/62 |
| | | | 52/630 |
| 6,360,483 B1 | 3/2002 | Sherfield | |
| 6,601,342 B2 | 8/2003 | Dummen | |
| 7,128,278 B2 | 10/2006 | Archambeau et al. | |
| 7,748,930 B2 | 7/2010 | Gesser et al. | |
| 7,770,814 B2 | 8/2010 | Archambeau et al. | |
| 7,877,927 B2 | 2/2011 | Roy et al. | |
| 8,528,250 B2 | 9/2013 | Nelson et al. | |
| 8,567,122 B2 | 10/2013 | Nelson et al. | |
| 8,621,781 B2 | 1/2014 | Singh | |
| 8,984,807 B2 | 3/2015 | Hansen et al. | |
| 9,032,665 B2 * | 5/2015 | Whitney | A01G 31/02 |
| | | | 47/62 A |
| 9,210,846 B2 | 12/2015 | VanLente | |
| 9,226,456 B2 | 1/2016 | Nelson et al. | |
| 9,807,949 B2 | 11/2017 | Hamlin | |
| 9,848,543 B2 | 12/2017 | Bletsos et al. | |
| 9,930,841 B2 | 4/2018 | Fankuchen | |
| 10,004,188 B2 * | 6/2018 | Williams | A01G 31/06 |
| 10,015,936 B2 * | 7/2018 | Lonergan | A01G 9/029 |
| 10,098,287 B2 * | 10/2018 | Heidl | A01G 9/247 |
| 10,631,469 B2 * | 4/2020 | Sahu | A01G 31/06 |
| 10,781,123 B2 | 9/2020 | Major et al. | |
| 11,129,339 B2 * | 9/2021 | Spiro | A01G 9/0293 |
| 11,617,314 B2 * | 4/2023 | Deal | A01G 27/06 |
| | | | 47/81 |
| 2005/0166451 A1 * | 8/2005 | Stachnik | A01G 9/025 |
| | | | 47/65.7 |
| 2007/0079551 A1 * | 4/2007 | Tamura | A01C 11/02 |
| | | | 47/65.5 |
| 2007/0157513 A1 * | 7/2007 | Varney | A01G 9/026 |
| | | | 47/71 |
| 2010/0154300 A1 | 6/2010 | Wiersma | |
| 2011/0083761 A1 | 4/2011 | Evans | |
| 2015/0359181 A1 | 12/2015 | Yuristy et al. | |
| 2016/0235024 A1 | 8/2016 | Xu et al. | |
| 2016/0242372 A1 | 8/2016 | Wong et al. | |
| 2017/0099791 A1 | 4/2017 | Joseph et al. | |
| 2018/0310497 A1 | 11/2018 | Farmer | |
| 2019/0037788 A1 | 2/2019 | Takeuchi et al. | |
| 2019/0246580 A1 | 8/2019 | Hsueh et al. | |
| 2021/0113970 A1 * | 4/2021 | Stainer | B01D 71/26 |

FOREIGN PATENT DOCUMENTS

| | | |
|---|---|---|
| JP | 2008061503 A | 3/2008 |
| JP | 2008154505 A | 7/2008 |
| JP | 2014076008 A | 5/2014 |
| NL | 1025573 C1 | 2/2005 |
| WO | 1990/011348 A1 | 10/1990 |
| WO | 2002/072599 A1 | 9/2002 |
| WO | 2007/056794 A1 | 5/2007 |
| WO | 2007105667 A1 | 9/2007 |
| WO | 2008035580 A1 | 3/2008 |
| WO | 2009/092905 A2 | 7/2009 |
| WO | 2011/120267 A1 | 10/2011 |
| WO | 2013/182309 A1 | 12/2013 |
| WO | 2014/19190571 A1 | 12/2014 |
| WO | 2015/182223 A1 | 12/2015 |
| WO | 2018/143450 A1 | 8/2018 |
| WO | 2018/193784 A1 | 10/2018 |
| WO | 2018/225560 A1 | 12/2018 |
| WO | 2020/201214 A1 | 10/2020 |

* cited by examiner

EFFICIENT HYDROPONIC CULTIVATION SYSTEM AND METHOD

FIELD OF THE INVENTION

Disclosed embodiments relate generally to hydroponics, and more particularly to a system and method for efficient hydroponic cultivation.

BACKGROUND

Hydroponics is a method of growing plants primarily without soil in an oxygenated, water-based, nutrient rich solution. Hydroponic cultivation systems can be used to grow plants in various environments, including greenhouse and outdoor environments. One well-known type of hydroponic system is the nutrient film technique or NFT system. In NFT systems, a shallow stream of oxygenated, water-based, nutrient rich solution flows continuously through channels, e.g., pipes or gutters made from plastic or water-resistant, non-air-permeable, polymer sheets. Plants are suspended above the channels and their roots hang down partially into the continuously flowing solution.

Another well-known version of a hydroponic cultivation system is the Deep Water Culture or DWC system. In DWC systems, oxygenated, water-based, nutrient rich solution is maintained in a reservoir or container, e.g., tubs or elongated troughs made from plastic or water-resistant, non-air-permeable, polymer sheets. Plants are suspended above the tubs or elongated troughs and their roots are partially or completely submerged in the solution.

Such well-known hydroponic systems, however, rely heavily on electrical devices such as pumps, aerators, motors, and paddles to (i) maintain a sufficient amount and/or continuous flow of solution over the roots of the plants, (ii) maintain the necessary oxygen levels in the solution, and/or (iii) provide fresh solution to the roots of the plants. Because such well-known hydroponic systems are critically dependent on electronic devices, any disruption to these devices, such as the loss of electricity, can cause an immediate break down of the entire system, leading to significant damage to or loss of the plants. In addition, the electrical power required to operate such devices can be a significant cost burden in the operation of these hydroponic systems.

Accordingly, there is a need and desire for a more productive, efficient, reliable, and cost-effective system and method of hydroponic cultivation.

SUMMARY

In one aspect, the present disclosure provides a hydroponic system. The system comprises one or more plant support structures that hold plant matter. The one or more plant support structures have one or more holes. The system also comprises one or more housing membranes that are air-permeable and water-resistant, house a solution and at least a portion of the one or more plant support structures, and have one or more openings into which at least a portion of the one or more plant support structures fit. The system further comprises one or more frames that support the one or more housing membranes.

In one embodiment, the one or more housing membranes house at least a portion of the one or more plant support structures. In another embodiment, the one or more plant support structures further comprise a soilless plant medium. In another embodiment, the one or more plant support structures are connected to the one or more housing membranes or the one or more frames.

In one embodiment, the one or more housing membranes have a Gurley Hill porosity of from about 1 to about 100 seconds per 100 cc air. In another embodiment, the one or more housing membranes have a Gurley Hill porosity of from about 10 to about 50 seconds per 100 cc air. In another embodiment, the one or more housing membranes have a resistance to water penetration of from about 50 to about 1000 cm of $H_2O$. In another embodiment, the one or more housing membranes have a resistance to water penetration of from about 100 to about 500 cm of $H_2O$. In another embodiment, the one or more housing membranes have a total reflectivity of greater than about 80%. In another embodiment, the one or more housing membranes have a moisture vapor transmission rate of from about 400 to about 3500 $g/m^2/day$. In another embodiment, the one or more housing membranes have a moisture vapor transmission rate of from about 750 to about 2000 $g/m^2/day$. In another embodiment, the one or more housing membranes have a maximum elongation of less than about 40%.

In one embodiment, the one or more housing membranes are polyolefin. In another embodiment, the one or more housing membranes are polyethylene. In another embodiment, the one or more housing membranes are polypropylene. In another embodiment, the one or more housing membranes are nonwoven flash spun plexifilamentary sheet of polyethylene.

In one embodiment, at least one of the one or more housing membranes is one component. In another embodiment, at least one of the one or more housing membranes has two or more components. In another embodiment, the one or more housing membranes is at least 10 housing membranes.

In another aspect, the present disclosure provides a hydroponic system. The system comprises one or more plant support structures that hold plant matter. The system also comprises one or more housing membranes that are air-permeable and water-resistant, house a solution and at least a portion of the one or more plant support structures, and have one or more openings into which a portion of the one or more plant support structures fits. The system further comprises one or more frames that support the one or more housing membranes. The one or more plant support structures are soilless, comprise a soilless plant medium, and have one or more holes in the sides or base of the one or more plant support structures. The one or more housing membranes are polyolefin, and have a Gurley Hill porosity of from about 1 to about 100 seconds per 100 cc air, a resistance to water penetration of from about 100 to about 500 cm of $H_2O$, and a moisture vapor transmission rate of from about 400 to about 3500 $g/m^2/day$ $g/m^2/day$. The solution comprises water and nutrients.

In another aspect, the present disclosure provides a hydroponic system. The system comprises one or more plant support structures for holding plant matter; one or more housing membranes for housing a solution and at least a portion of the one or more plant support structures; and one or more frames for supporting the one or more housing membranes. The one or more plant support structures have one or more holes for allowing a solution to reach the plant matter inside of the one or more plant support structures or the roots of the plant matter to extend outside the one or more plant support structures into the housing membrane. The one or more housing membranes are air-permeable, water-resistant, and have one or more openings for at least a portion of the one or more plant support structures to fit into.

In another aspect, the present disclosure provides a method for hydroponic cultivation. The method comprises inserting plant matter in one or more plant support structures that have one or more holes. The method also comprises placing at least a portion of the one or more plant support structures into one or more openings in one or more housing membranes. The one or more housing membranes are air-permeable, water-resistant, and supported by one or more frames. The method further comprises providing a solution in the one or more housing membranes to create a static water table.

In one embodiment, the one or more plant support structures further comprise a soilless plant medium. In another embodiment, the one or more plant support structures are connected to the one or more housing membranes or the one or more frames.

In one embodiment, the one or more housing membranes have a Gurley Hill porosity of from about 1 to about 100 seconds per 100 cc air. In another embodiment, the one or more housing membranes have a Gurley Hill porosity of from about 10 to about 50 seconds per 100 cc air. In another embodiment, the one or more housing membranes have a resistance to water penetration of from about 50 to about 1000 cm of $H_2O$. In another embodiment, the one or more housing membranes have a resistance to water penetration of from about 100 to about 500 cm of $H_2O$. In another embodiment, the one or more housing membranes have a total reflectivity of greater than about 80%. In another embodiment, the one or more housing membranes have a moisture vapor transmission rate of from about 400 to about 3500 $g/m^2/day$. In another embodiment, the one or more housing membranes have a moisture vapor transmission rate of from about 750 to about 2000 $g/m^2/day$. In another embodiment, the one or more housing membranes have a maximum elongation of less than about 40%.

In one embodiment, the one or more housing membranes are polyolefin. In another embodiment, the one or more housing membranes are polyethylene. In another embodiment, the one or more housing membranes are polypropylene. In another embodiment, the one or more housing membranes are nonwoven flash spun plexifilamentary sheet of polyethylene.

In one embodiment, at least one of the one or more housing membranes is one component. In another embodiment, at least one of the one or more housing membranes has two or more components. In another embodiment, the one or more housing membranes is at least 10 housing membranes. In another embodiment, the one or more housing membranes is at least 100 housing membranes.

DETAILED DESCRIPTION

In the following detailed description, reference is made to the accompanying drawings which form a part hereof, and which illustrate specific embodiments of the invention. These embodiments are described in sufficient detail to enable those of ordinary skill in the art to make and use them. It is also understood that structural, logical, or procedural changes may be made to the specific embodiments disclosed herein without departing from the spirit or scope of the invention.

Figure 1:
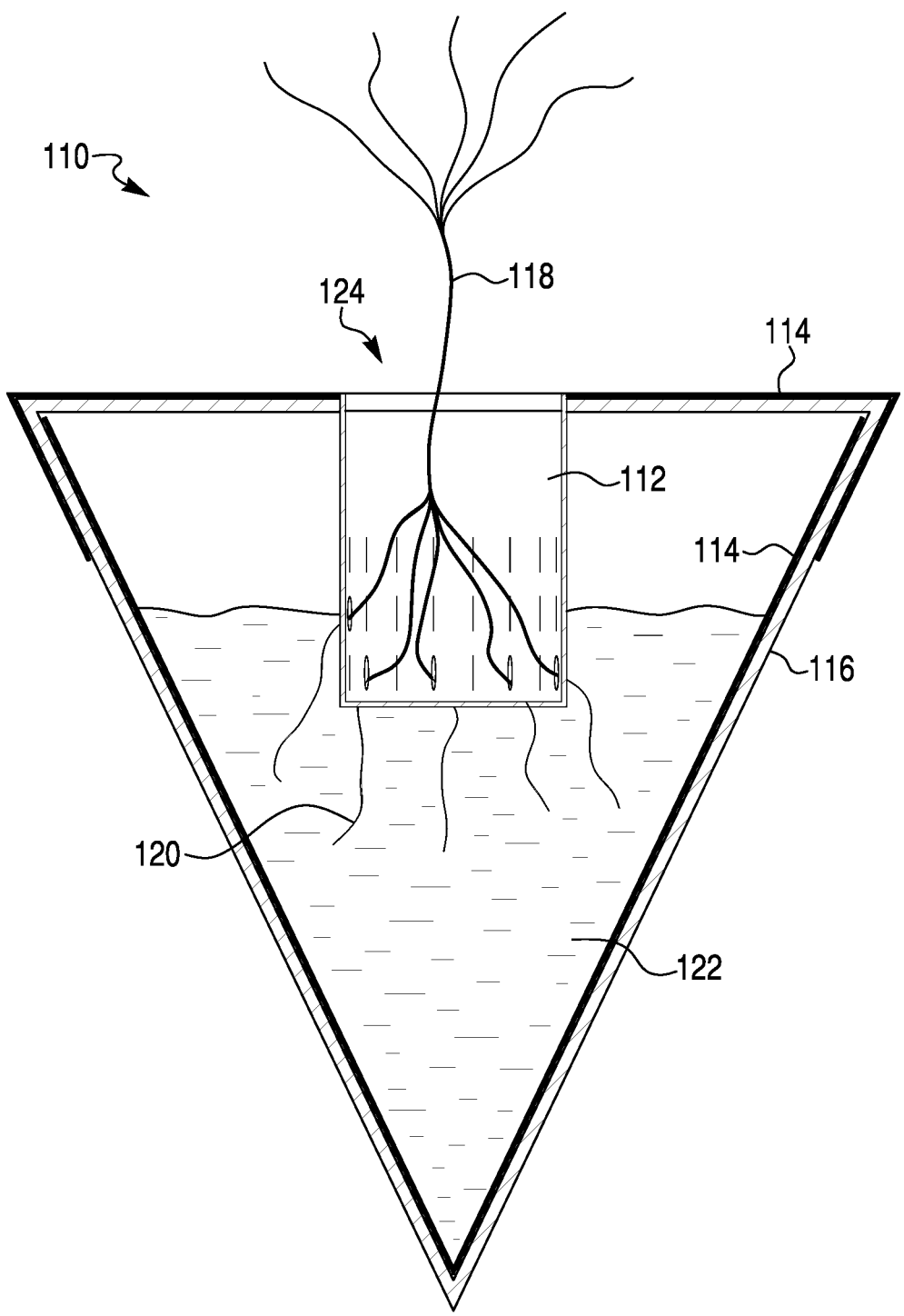
FIG. 1 is a cross-sectional side view of a hydroponic system according to an exemplary embodiment.

FIG. 1 illustrates an exemplary hydroponic system 110 for growing plants. The hydroponic system 110 comprises one or more plant support structures 112, a housing membrane 114, and a frame 116.

As shown in FIG. 1, the one or more plant support structures 112 are containers that hold plant matter 118. The one or more plant support structures 112 may be constructed from one or more of any suitable material known in the art, including, but not limited to, plastic, foam, rubber, glass, ceramic, metal, alloys, cellulose or other plant-derived materials, and composites thereof, and in one or more of any suitable form of material known in the art, including, but not limited to, rigid materials, flexible materials, woven fabrics, non-woven fabrics, collars, and nets.

As used herein, "hold" means to directly or indirectly support, hold, and/or house. As also used herein, "plant matter" refers to one or more seeds, cuttings, or plants, and may or may not include a seed plug or a self-supporting block of porous material. The seed plugs or self-supporting blocks of porous material may be one or more of any suitable material known in the art, including, but not limited to, open polymer foams, mineral wool, rock wool, compressed coconut fiber, and peat moss. The one or more plant support structures 112 may be any suitable shape or size.

As shown in FIG. 1, the one or more plant support structures 112 have one or more holes in the sides and/or base of the one or more plant support structures 112. The holes in the one or more plant support structures 112 allow a solution 122 to reach the plant matter 118 inside of the one or more plant support structures 112 and allow the roots 120 of the plant matter 118 to extend outside the one or more plant support structures 112 into the housing membrane 114, where they can grow and further absorb water and nutrients from the solution 122.

In some embodiments, the one or more plant support structures 112 may contain a soilless plant medium. The soilless plant medium may be any medium for hydroponic systems known in the art, including, but not limited to, coconut coir, lightweight expanded clay aggregate (LECA), rockwool, perlite, vermiculite, sand, gravel, growstones, rice hull, peat moss, or any combination of mediums.

As shown in FIG. 1, the housing membrane 114 houses the one or more plant support structures 112 and the solution 122. In some embodiments, the housing membrane 114 may completely house the one or more plant support structures 112 and in other embodiments the housing membrane 114 may partially house the one or more plant support structures 112. The one or more plant support structures 112 may be positioned anywhere along the housing membrane 114 and in any manner, such as randomly or in rows. As shown in FIG. 1, the housing membrane 114 is in the shape of a triangular prism. However, in some embodiments, the housing membrane 114 may be any suitable shape or size. The housing membrane 114 includes one or more openings 124 for the one or more plant support structures 112 to completely or partially fit into. The one or more openings 124 may be any suitable shape or size, and may be positioned anywhere on the housing membrane 114 and in any manner, such as randomly or in rows. In some embodiments, the one or more plant support structures 112 may be connected to the housing membrane 114 and/or frame 116 in any suitable manner known in the art. As used herein, "connected to" means directly or indirectly fixed to, attached to, connected to, held by, and/or supported by. In other embodiments, the one or more plant support structures 112 may not be connected to the housing membrane 114 and/or frame 116, and instead may be separately suspended over and/or into the housing membrane 114 in any suitable manner known in the art. In other embodiments, the one or more plant support structures 112 may not be connected to the housing membrane 114 and/or frame 116, and instead may float on the solution 122 within the housing membrane 114.

As shown in FIG. 1, the top of the one or more plant support structures 112 is parallel to and flush with the top of the housing membrane 114. However, in some embodiments, the top of the one or more plant support structures 112 may be above or below the top of the housing membrane 114. In some embodiments, the one or more plant support structures 112 may also be positioned at any angle with respect to the top of the housing membrane 114 and in any direction. In some embodiments, the one or more plant support structures 112 occupy less than about 80% of the volume within the housing membrane 114, in other embodiments less than about 50% of the volume within the housing membrane 114, in other embodiments less than about 20% of the volume within the housing membrane 114, and in other embodiments less than about 10% of the volume within the housing membrane 114.

The housing membrane 114 may be constructed from one or more of any suitable material known in the art that is air-permeable and water-resistant. In some embodiments, the housing membrane 114 may be an air-permeable and water-resistant polyolefin, polyamide, polyaramid, polyester, polyimide, polyacrylate, poly(tetrafluoroethylene), copolymer comprising tetrafluoroethylene or other fluorinated copolymer, and/or hybrids and mixtures thereof.

As used herein, "polyolefin" is intended to mean any of a series of largely saturated polymeric hydrocarbons composed only of carbon and hydrogen. Typical polyolefins include, but are not limited to, polyethylene, polypropylene, polymethylpentene, and copolymers comprising various combinations of the monomers ethylene, propylene, and methylpentene.

As used herein, "polyethylene" is intended to encompass not only homopolymers of ethylene, but also copolymers wherein at least 85% of the recurring units are ethylene units such as copolymers of ethylene and alpha-olefins. Preferred polyethylenes include low-density polyethylene, linear low-density polyethylene, and high-density polyethylene.

As used herein, "polypropylene" is intended to embrace not only homopolymers of propylene but also copolymers wherein at least 85% of the recurring units are propylene units. Preferred polypropylene polymers include isotactic polypropylene and syndiotactic polypropylene.

The air-permeability of the housing membrane 114 allows for the passage of oxygen into the housing membrane 114 and the exit of carbon dioxide out of the housing membrane 114. In some embodiments, the housing membrane 114 has a Gurley Hill porosity, according to ISO 5636-5, of less than about 1000 seconds per 100 cc air, in other embodiments of less than about 500 seconds per 100 cc air, in other embodiments less than about 100 seconds per 100 cc air, in other embodiments less than about 50 seconds per 100 cc air, in other embodiments less than about 10 seconds per 100 cc air, in other embodiments less than about 1 second per 100 cc air, in other embodiments from about 0.5 to about 1000 seconds per 100 cc air, in other embodiments from about 1 to about 500 seconds per 100 cc air, in other embodiments from about 1 to about 100 seconds per 100 cc air, and in other embodiments from about 10 to about 50 seconds per 100 cc air. This property is a measure of how long it takes a defined volume of air to pass through an area of porous material wherein a certain pressure gradient exists; therefore, lower numbers mean the material is more air-permeable, and higher numbers mean the material is less air-permeable. The water-resistance of the housing membrane 114 allows the solution 122 to remain within the housing membrane 114 without leaking. In some embodiments, the housing membrane 114 has a resistance to water penetration (i.e., hydrostatic head), as measured using a hydrostatic pressure tester, for example, available as FX 3000 from Textest Instruments (Zurich, Switzerland), according to EN 20811, of greater than about 50 cm of $H_2O$, in other embodiments of greater than about 100 cm of $H_2O$, in other embodiments from about 50 cm of $H_2O$ to about 1000 cm of $H_2O$, in other embodiments from about 100 to about 500 cm of $H_2O$, in other embodiments from about 100 to about 350 cm of $H_2O$, and in other embodiments from about 100 to about 200 cm of $H_2O$.

In some embodiments, the housing membrane 114 may also be constructed from one or more of any suitable material known in the art that is light reflective. In some embodiments, the housing membrane 114 may also function as a reflective barrier, meaning that the portion of incident light not transmitted to the interior is reflected from the surface, rather than being absorbed in the material itself. The reflection of solar radiation by the material prevents the exterior of housing membrane 114 from over-heating, thereby helping to keep the solution 122, and soilless plant medium (if used), cooler. Studies by Sattelmacher et al. and Du et al. indicate that higher root temperature results in the reduction of root growth and a subsequent decline of leaf expansion. (See Sattelmacher, B., Gerendas, J., Thorns, K., Brück, H., & Bagdady, N. H. (1993). Interaction Between Root Growth and Mineral Nutrition. *Environmental and Experimental Botany*, Vol. 33, No. 1, pp. 63-73; Du, Y. C. & Tachibana, S. (1994). Effect of Supraoptimal Root Temperature on the Growth, Root Respiration and Sugar Content of Cucumber Plants. *Scientia Horticulturae*, Vol. 58, pp. 289-301). In addition, solubility of oxygen in nutrient solution also decreases with an increase of temperature, which may adversely affect plant growth. (See Du et al., Effect of Supraoptimal Root Temperature on the Growth, Root Respiration and Sugar Content of Cucumber Plants). Additionally, photosynthetically active light reflected from the housing membrane 114 is available to be absorbed by the leaves of the plant matter 118 to further encourage their growth. In some embodiments, the housing membrane 114 has a total reflectivity, as measured using a spectrometer, for example, available as Lambda 650 UV/Vis Spectrophotometer from PerkinElmer (Waltham, MA, U.S.A.), according to ASTM E1164-02 in the range of 350-1050 nm, of greater than about 65%, in some embodiments greater than about 80%, in some embodiments greater than about 90%, and in some embodiments greater than about 95%.

In some embodiments, the housing membrane 114 has a Moisture Vapor Transmission Rate (MVTR), as measured using, for example, an FX 3150 from Textest Instruments (Zurich, Switzerland), according to ATSM E96, of greater than 100 g/m²/day (grams per square meter per day), in other embodiments greater than about 400 g/m²/day, in other embodiments greater than 1000 g/m²/day, in other embodiments from about 100 to about 8000 g/m²/day, in other embodiments from about 400 to about 3500 g/m²/day, and in other embodiments from about 750 to about 2000 g/m²/day.

In some embodiments, the housing membrane 114 has a low elasticity allowing it to maintain its shape in areas that are not in direct contact with the frame 116 when the housing membrane 114 is partially or completely filled by the solution 122. In some embodiments, the housing membrane 114 has an elastic modulus, as measured using a cross-sectional area calculated from a thickness determined by EN ISO 534, according to a standard tensile properties test method EN 12311-1, of greater than about 50 MPa, in other embodiments greater than about 100 MPa, in other embodiments greater than about 200 MPa, and in other embodiments greater than about 300 MPa. In other embodiments, the maximum elongation of the housing membrane 114 according to EN 12311-1 is less than about 40%, in other embodiments less than about 30%, and in other embodiments less than about 20%.

The housing membrane 114 may be in one or more of any suitable form of material known in the art, including, but not limited to, sheets, fabrics, films, microporous films, membranes, laminates, or combinations thereof. In some embodiments, the housing membrane 114 may be a woven, nonwoven or knitted fabric or sheet, combinations thereof, or coated variants thereof (e.g., coated with an air-permeable coating). In some embodiments, the housing membrane 114 may be an SMS (spunbonded-meltblown-spunbonded) non-woven fabric.

In some embodiments, the housing membrane 114 is a nonwoven flash spun plexifilamentary sheet of polyethylene. Such sheets are available under the tradename Tyvek® from DuPont in Wilmington, DE As used herein, "plexifilament" means a three-dimensional integral network or web of a multitude of thin, ribbon-like, film-fibril elements of random length. Typically, these have a mean film thickness of less than about 4 micrometers and a median fibril width of less than about 25 micrometers. The average film-fibril cross sectional area if mathematically converted to a circular area would yield an effective diameter between about 1 micrometer and about 25 micrometers. In plexifilamentary structures, the film-fibril elements intermittently unite and separate at irregular intervals in various places throughout the length, width and thickness of the structure to form a continuous three-dimensional network. Examples of plexifilamentary webs are those produced by the flash spinning processes described in U.S. Pat. No. 3,081,519 (Blades et al.), 3,169,899 (Steuber), 3,227,784 (Blades et al.), and 3,851,023 (Brethauer et al.), the contents of which are hereby incorporated by reference in their entirety.

The housing membrane 114 may also be constructed from one component or multiple components, including, but not limited to, a top and a bottom (as shown in FIG. 1), that may each be comprised of the same or different materials. In some embodiments, the housing membrane 114 is absent of any joints or seals, and in other embodiments the housing membrane 114 may contain one or more joints or seals.

The frame 116 provides structural support and balance for the housing membrane 114. The frame 116 may be any suitable shape or size, and may be arranged in any pattern. The frame 116 may be constructed from one or more of any suitable material known in the art, including, but not limited to, natural or synthetic fibers (e.g., rope/netting), rubber, urethane, plastic, glass, ceramic, metal, alloy, and composites thereof. The frame 116 is preferably a material that is corrosion-resistant. The frame 116 may also be constructed from one component or multiple components, that may each be comprised of the same or different materials. In some embodiments, the frame 116 may sit or be positioned on the ground/walking level by any suitable manner known in the art, and in other embodiments, it may be held or positioned above/off the ground/walking level by any suitable manner known in the art, including, but not limited to, rope, chains, shelves, etc.

The solution 122 in the housing membrane 114 creates a water table that may be at various levels in the housing membrane 114, including as high as the top of the housing membrane 114. In some embodiments, the solution 122 occupies at least about 5% of the volume within the housing membrane 114, in other embodiments at least about 10% of the volume within the housing membrane 114, in other embodiments at least about 20% of the volume within the housing membrane 114, in other embodiments at least about 50% of the volume within the housing membrane 114, in other embodiments at least about 80% of the volume within the housing membrane 114, in other embodiments at least about 90% of the volume within the housing membrane 114, in other embodiments 100% of the volume within the housing membrane 114. The solution 122 may be any solution known in the art that is used to grow plants, including, but not limited to, solutions that include water, nutrients, fungicide, insecticide, growth regulators or promotors or enzymes, pH adjusters, fertilizers, and variations thereof. Nutrients may include one or more of any nutrient known in the art that is used to grow plants, including, but not limited to, N (Nitrogen), P (Phosphorus), K (Potassium), Ca (Calcium), Cl (Chlorine), Cu (Copper), Fe (Iron), Mg (Magnesium), Mn (Manganese), Mo (Molybdenum), S (Sulfur), B (Boron), Zn (Zinc), and variations thereof.

In some embodiments, a plurality of housing membranes 114 may be included in the hydroponic system 110, including, for example, at least 10 housing membranes, at least 25 housing membranes, at least 50 housing membranes, at least 100 housing membranes, at least 500 housing membranes, at least 1000 housing membranes, at least 2000 housing membranes, at least 3000 housing membranes, at least 4000 housing membranes, at least 5000 housing membranes, and at least 10,000 housing membranes. The housing membranes 114 may be the same or different shapes and may be arranged randomly or in any configuration vertically or horizontally. For instance, multiple housing membranes 114 may be aligned in adjacent rows, positioned above and below each other, or both, to form a multi-row and/or multi-level hydroponic system 110.

In some embodiments, a plurality of plant support structures 112 may be included in the hydroponic system 110, including, for example, at least 10 plant support structures, at least 25 plant support structures, at least 50 plant support structures, at least 100 plant support structures, at least 500 plant support structures, at least 1000 plant support structures, at least 2000 plant support structures, at least 3000 plant support structures, at least 4000 plant support structures, at least 5000 plant support structures, and at least 10,000 plant support structures.

In some embodiments, the system 110 may be portable.

Figure 2:
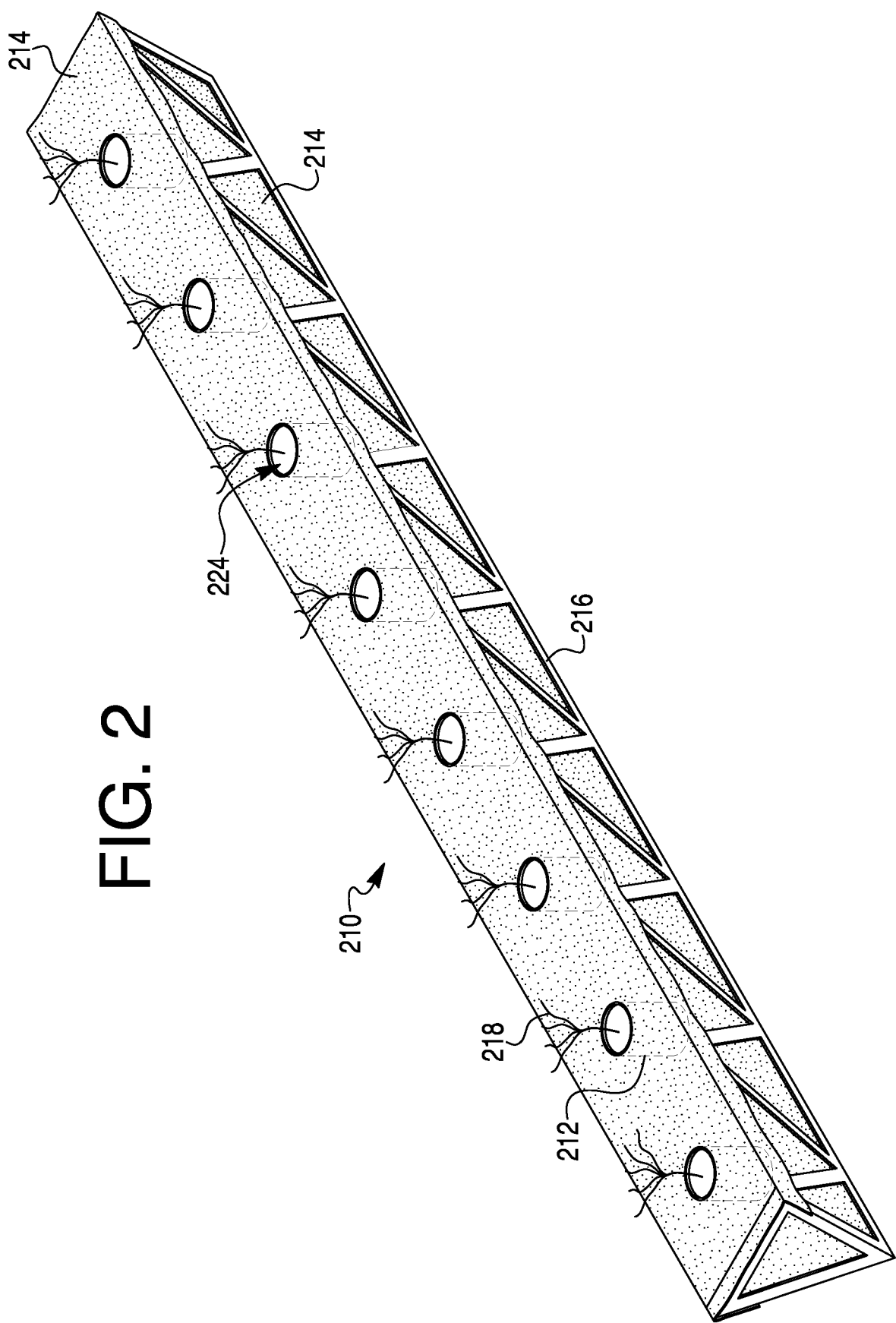
FIG. 2 is a perspective view of a hydroponic system with a plurality of plant support structures according to an exemplary embodiment.

FIG. 2 illustrates an exemplary hydroponic system 210 with a plurality of plant support structures 212. The hydroponic system 210 comprises a plurality of plant support structures 212 that hold plant matter 218, a housing membrane 214 that houses the plurality of plant support structures 212 and a solution 222 (not shown), and a frame 216. The housing membrane 214 includes a plurality of openings 224 for the one or more plant support structures 212 to fit into.

As shown in FIG. 2, the frame 216 borders portions of the housing membrane 214 for support, including being arranged in a chevron pattern along the sides of the housing membrane 214. However, in some embodiments, the frame 216 may be designed and constructed in any suitable manner, including in any position, arrangement, pattern, size, or shape, to provide support to the housing membrane 214 while allowing air to enter through at least portions of the housing membrane 214.

Figure 3:
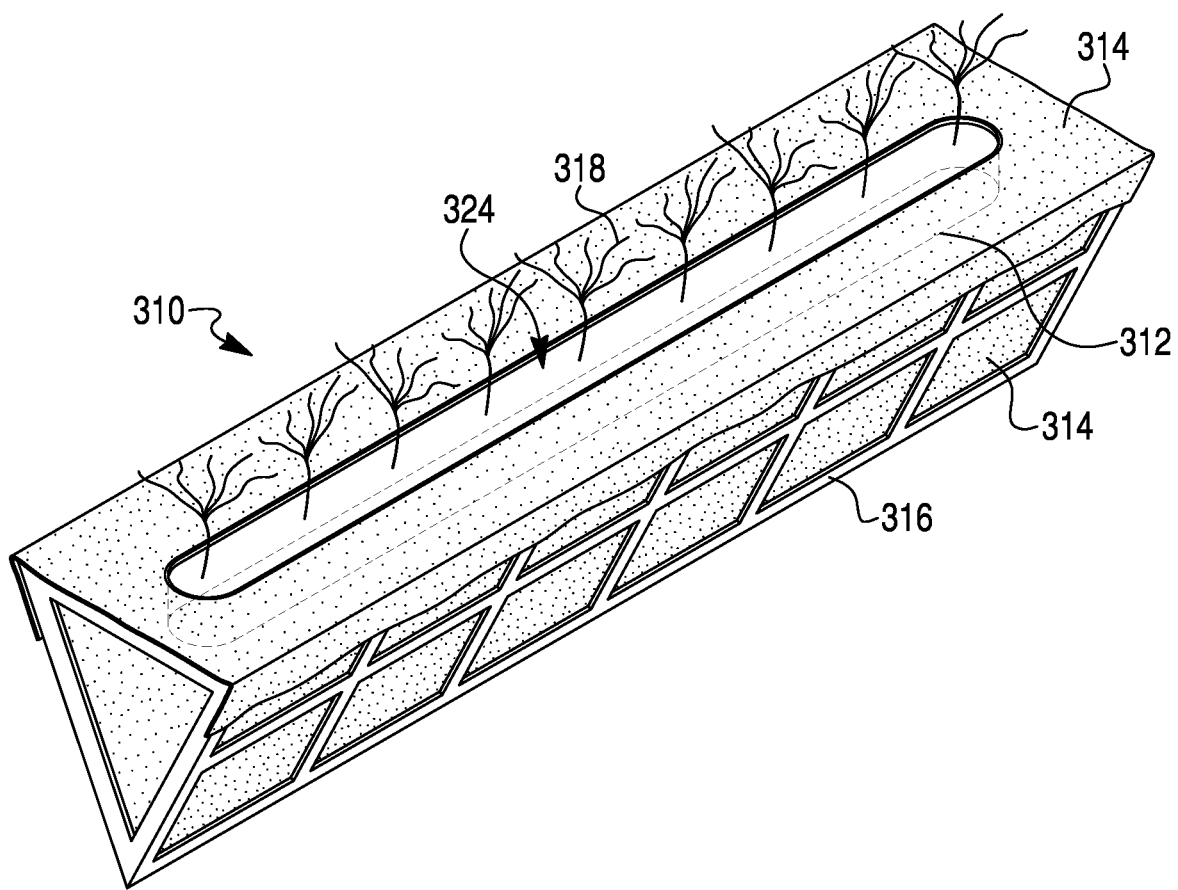
FIG. 3 is a perspective view of a hydroponic system with one plant support structure that holds a plurality of plant matter according to an exemplary embodiment.

FIG. 3 illustrates an exemplary hydroponic system 310 that includes a housing membrane 314 with one plant support structure 312 that holds a plurality of plant matter 318. The hydroponic system 310 comprises a plant support structure 312 that holds a plurality of plant matter 318, a housing membrane 314 that houses the plant support structure 312 and a solution 322 (not shown), and a frame 316. The housing membrane 314 includes an opening 324 for the plant support structure 312 to fit into. As shown in FIG. 3, the plant support structure 312 and the opening 324 are shaped like an elongated racetrack oval. However, in some embodiments, the plant support structure 312 and the opening 324 may be any suitable shape or size, and may be positioned anywhere on the housing membrane 314.

As shown in FIG. 3, the frame 316 borders portions of the housing membrane 314 for support, including being arranged in a checked pattern along the sides of the housing membrane 314. In some embodiments, the frame 316 may be designed and constructed in any suitable manner, including in any position, arrangement, pattern, size, or shape, to provide support to the housing membrane 314 while allowing air to enter through at least portions of the housing membrane 314.

Figure 4:
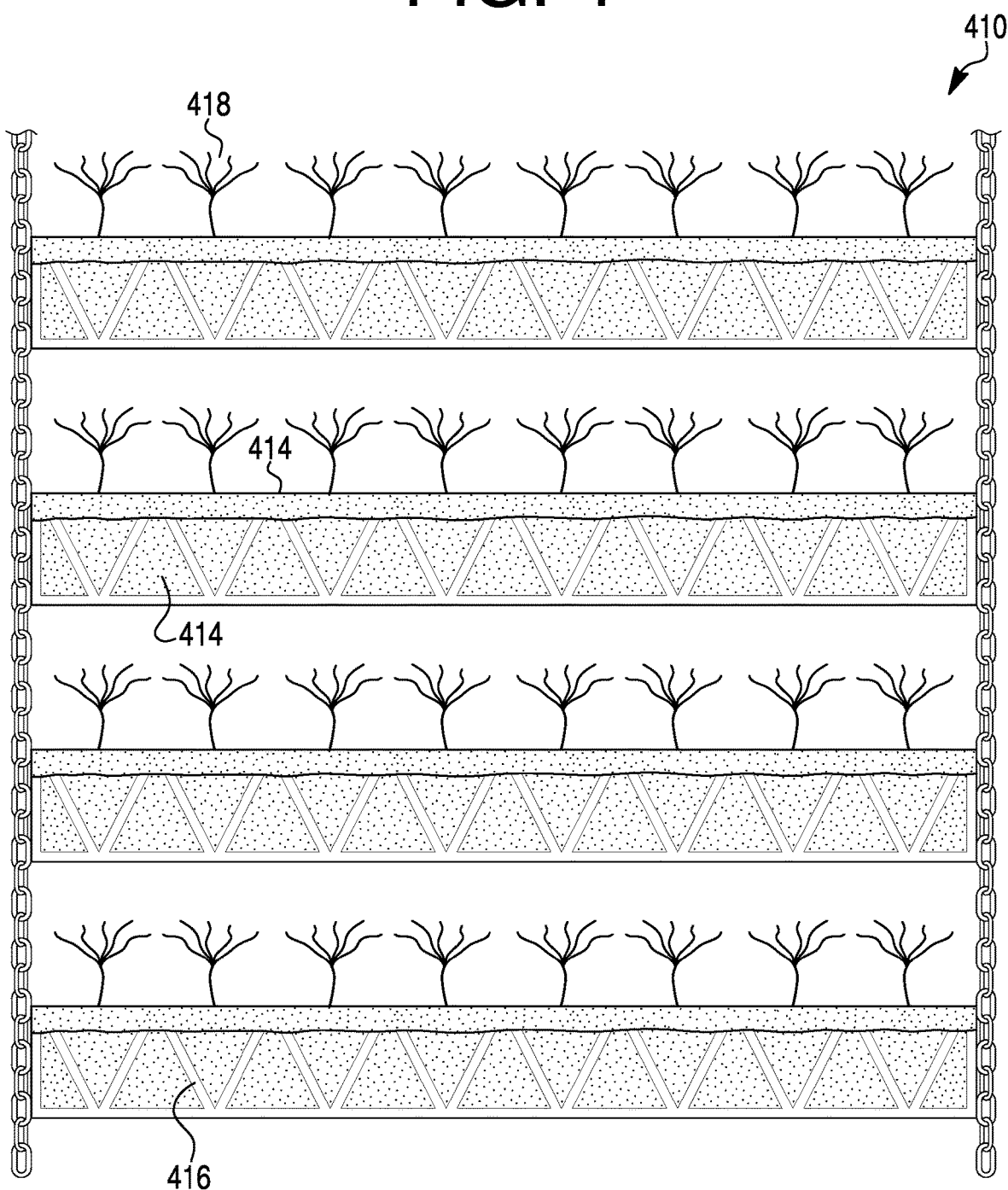
FIG. 4 is a front view of a hydroponic system with a plurality of housing membranes arranged vertically according to an exemplary embodiment.

FIG. 4 illustrates an exemplary hydroponic system 410 with a plurality of housing membranes 414 arranged vertically. The hydroponic system 410 comprises a plurality of housing membranes 414 and a plurality of frames 416. The plurality of housing membranes 414 house one or more plant support structures 412 (not shown) and a solution 422 (not shown). The plurality of housing membranes 414 include one or more openings 424 (not shown) for the one or more plant support structures 412 to fit into. The one or more plant support structures 412 (not shown) hold plant matter 418.

Figure 5:
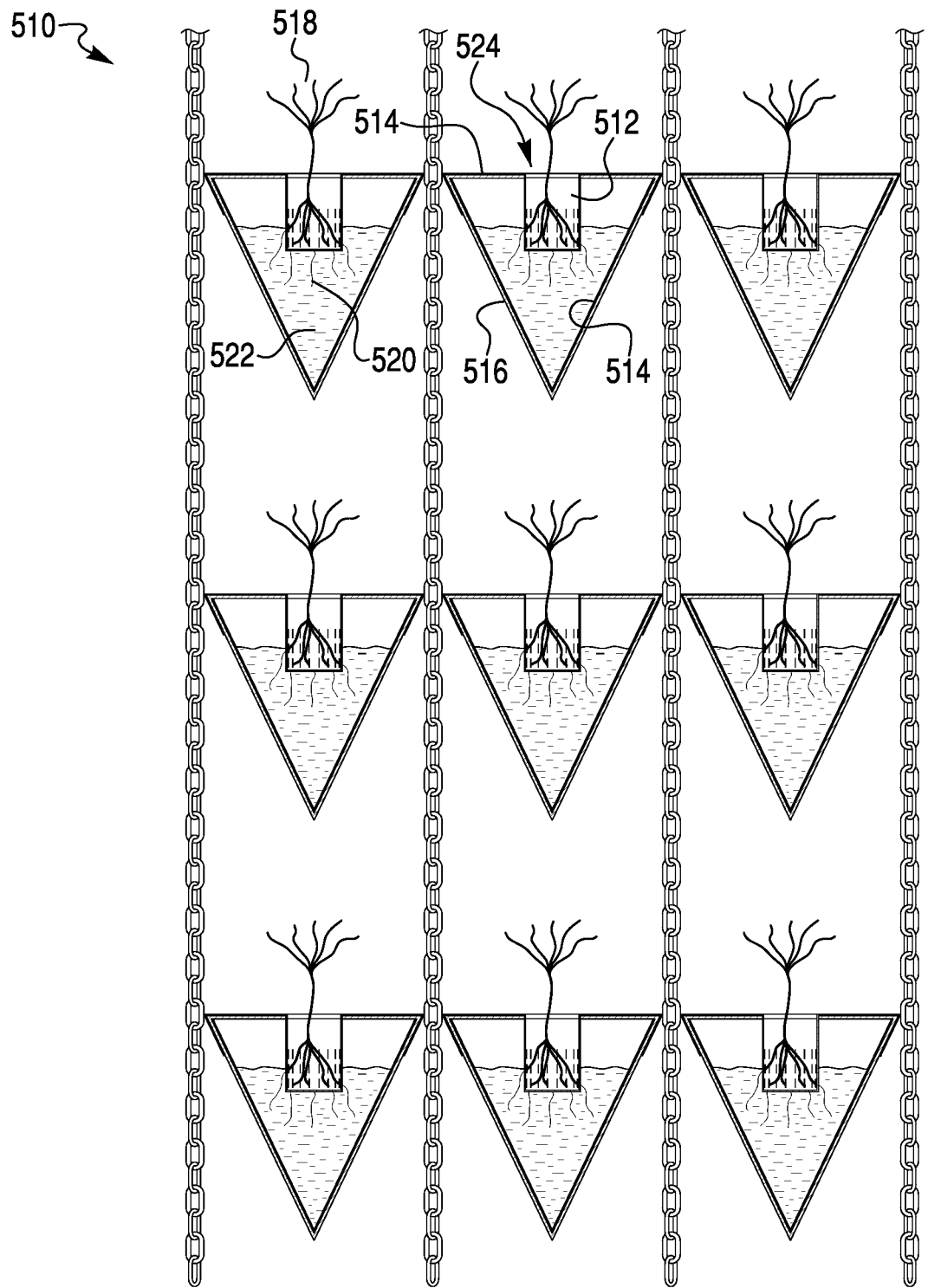
FIG. 5 is a side view of a hydroponic system with a plurality of housing membranes arranged horizontally and vertically according to an exemplary embodiment.

FIG. 5 illustrates an exemplary hydroponic system 510 with a plurality of housing membranes 514 arranged horizontally and vertically. The hydroponic system 510 comprises a plurality of housing membranes 514 and a plurality of frames 516. The plurality of housing membranes 514 house one or more plant support structures 512, and a solution 522. The plurality of housing membranes 514 include one or more openings 524 for the one or more plant support structures 512 to fit into. The one or more plant support structures 512 hold plant matter 518. The one or more plant support structures 512 have one or more holes in the sides and/or base of the one or more plant support structures 512 to allow the solution 522 to feed the plant matter 518 and/or roots 520 of the plant matter 518.

Figure 6:
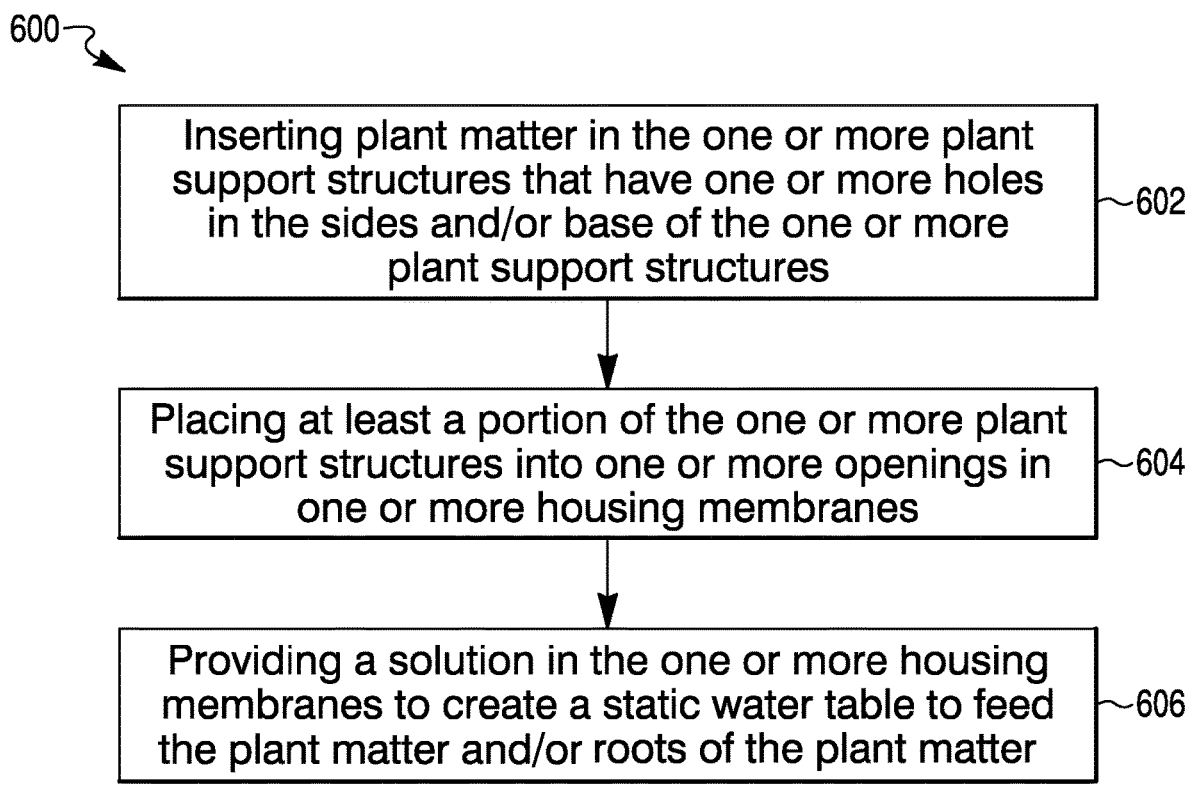
FIG. 6 is a flowchart of a method for growing plants according to an exemplary embodiment.

FIG. 6 illustrates a flowchart of an embodiment of a method 600 for growing plants that, for example, may be used with the hydroponic system 110 as shown in FIG. 1. The method 600 comprises a step 602 of inserting plant matter 118 in the one or more plant support structures 112 that have one or more holes in the sides and/or base of the one or more plant support structures 112.

The method 600 further comprises a step 604 of placing at least a portion of the one or more plant support structures 112 into the one or more openings 124 in one or more housing membranes 114.

The method 600 further comprises a step 606 of providing a solution 122 in the one or more housing membranes 114 to create a static water table to feed the plant matter 118 and/or roots 120 of the plant matter 118.

Importantly, the steps may be performed in any order. For example, when carrying out the method 600 for growing plants, the step 602 of inserting plant matter 118 in the one or more plant support structures 112 that have one or more holes in the sides and/or base of the one or more plant support structures 112 may occur after the step 604 of placing at least a portion of the one or more plant support structures into the one or more openings 124 in the one or more housing membranes 114 and/or after the step 606 of providing a solution 122 in the one or more housing membranes 114 to create a static water table. Likewise, the step 606 of providing a solution 122 in the one or more housing membranes 114 to create a static water table may occur before the step 602 of inserting plant matter 118 in the one or more plant support structures 112 that have one or more holes and/or before the step 604 of placing at least a portion of the one or more plant support structures into the one or more openings 124 in the one or more housing membranes 114. Additional steps may also be included in the method 600 for growing plants.

Test Methods

Moisture vapor transmission rate was measured according to ATSM E96.

Gurley Hill porosity was measured according to ISO 5636-5.

Resistance to water penetration was measured according to EN 20811.

Maximum elongation was measured according to EN 12311-1.

Elastic modulus was calculated according to EN 12311-1 using a cross-sectional area calculated from a thickness determined by EN ISO 534.

Total reflectivity was measured according to ASTM E1164-02.

Turbidity was measured according to IS 3025—Part 16.

Dissolved oxygen (mg/L) was measured according to APHA 23rd ed 4500-O—C.

pH at 25° C. was measured according to 23rd ed 4500-$H^+$(B).

Total dissolved solids (mg/L) was measured according to APHA 23rd ed 2540-Solid(C).

Total suspended solids (mg/L) was measured according to APHA 23rd ed 2540-Solid(D).

Conductivity (0/cm) at 25° C. was measured according to 23rd ed 2510 B.

Total organic carbon (ppb) was measured according to APHA 23rd ed 5310-TOC-(B).

Total plate count (cfu/ml) was measured according to IS: 5402:2012.

Coli forms (cfu/100 ml) was measured according to IS: 15185:2002.

Yeast and mold (cfu/100 ml) was measured according to IS 5403:1999 (Reaffirmed—2009).

Algae (Present/absent in 100 ml) was measured according to APHA 22nd ed 10200 F (Staining Technique).

EXAMPLES

The following examples are given to illustrate certain embodiments of the invention and should not be interpreted as limiting it in any way.

Example 1

A hydroponics set up was prepared in a greenhouse (at 28° C., 65% relative humidity) using a Tyvek® 1073B housing membrane. A 5 m long frame was constructed from metal in the shape of an inverted triangular cross-section (V shaped: 15 cm height, 25 cm base) to provide structural support and balance for the housing membrane. A housing membrane was constructed from Tyvek® 1073B and placed along all the edges of the frame and tethered to the frame using adhesive tape. The top flat surface of the housing membrane included openings 2" in diameter spaced 12" apart, into which plant support structures (i.e., seed cups in this instance), having holes, containing rice plants in 40 g soil were inserted. The plant support structures were 3" in height with a diameter of 2". The housing membrane was filled with approximately 65 L of a nutrient solution to a height of approximately 12.5 cm so that the nutrient solution was in constant direct contact with the plant support structures. Additional nutrient solution was added periodically during the experiment to maintain the height of approximately 12.5 cm. The composition of the nutrient solution was as follows:

| Fertilizer | Composition | g/100 L |
|---|---|---|
| Ammonium Sulphate | N-21%, S-24% | 10 |
| 19:19:19 | N-19%, P-19%, K-19% | 27 |
| 00:00:50 | K-50% | 34 |
| MgSO$_4$ | Mg-9.6%, S-12% | 36 |
| FeSO$_4$ (EDTA) | Fe-12% | 1.0 |
| Multiplex | Zn-5%, Fe-1%, Mn-1%, Br-0.5% | 2.0 |
| Mo | — | 0.4 |
| CaNO$_3$ | N-14.4%, Ca-18.8 | 90 |
| Citric Acid | Acid solution | 200 |

The plants grew to an approximate height of 1 m, with their roots growing outside of the plant support structures into the nutrient solution. To test the quality of water after 60 days, a 50 cc water sample was collected in a test tube from the bulk of the water table (i.e., from water beneath the surface of the water table). The test tube was hermetically sealed and sent for water testing within 24 hours.

Comparative Example 2

A hydroponics set up was prepared in a greenhouse (at 28° C., 65% relative humidity) using a PVC pipe. The PVC pipe was 5 m long with a diameter of 5". The top side of the PVC pipe included 2" openings, formed in a row every 12 inches, into which plant support structures (i.e., seed cups in this instance), having holes, containing rice plants in 40 g soil were inserted. The plant support structures were 3" in height with a diameter of 2". The plant support structures were in constant direct contact with nutrient solution (same as Example 1). The nutrient solution was continuously flowing, with an inlet at one end of the PVC pipe and an outlet at the other end. The outlet stream fell about 1 ft. into a fiber reinforced plastic tank and a motor pumped water from the open fiber reinforced plastic tank back to the inlet pipe. This allowed sufficient oxygen to be picked up from aeration. Similar to example 1, the plants grew to an approximate height of 1 m with their roots growing into the water table. To test the quality of water after 60 days, a 50 cc water sample was collected from the fiber reinforced plastic open tank which represents the average water quality conditions next to the plant roots. The test tube was hermetically sealed and sent for water testing within 24 hours.

Comparative Example 3

A conventional soil cultivation set up was prepared in a greenhouse (at 28° C., 65% relative humidity) using germinated rice plants in pots with 4 kg of soil. Water and fertilizer were provided at regular intervals and the rice plants were grown to an approximate height of 1 m with their roots growing into the soil. To test the quality of water in the pots after 60 days, a 50 cc water sample was collected. The test tube was hermetically sealed and sent for water testing within 24 hours.

TABLE 1A (Physical Parameters)

| Sample | Turbidity (NTU) | pH at 25° C. | Dissolved Oxygen (DO) (mg/L) | Total Dissolved Solids (mg/L) | Total Suspended Solids (mg/L) | Conductivity at 25° C. (µS/cm) |
|---|---|---|---|---|---|---|
| Example 1 | 2.62 | 8.24 | 2.4 | 458 | 6.3 | 662 |
| Comparative Example 2 | 6.72 | 4.21 | 2.6 | 1382 | 13.78 | 1988 |
| Comparative Example 3 | 48.9 | 7.32 | 4.4 | 746 | 74.6 | 1082 |

TABLE 1B (Biological Parameters)

| Sample | Total organic carbon (ppb) | Total Plate Count (cfu/ml) | Coli Forms (cfu/100 ml) | Algae (Present/absent in 100 ml) | Yeast and Mold (cfu/100 ml) |
|---|---|---|---|---|---|
| Example 1 | 1724 | 72 | Not detected | Absent | Not detected |
| Comparative Example 2 | 10124 | 168 | Not detected | Absent | Not detected |
| Comparative Example 3 | 15470 | 270 | 40 | Present | Not detected |

Water analysis of the examples, as shown in Tables 1A and 1B, show that Example 1 had a lower turbidity, total suspended solids, total organic content, and total plate count (i.e., bacteria count) than Comparative Example 2 and Comparative Example 3. The dissolved oxygen levels in Example 1 were comparable to Comparative Example 2, even with no mechanical addition through aeration.

Example 4

A hydroponics set up was prepared in a greenhouse (at 28° C., 65% relative humidity) using a Tyvek® 1073B housing membrane, as described in Example 1. At the harvesting stage, approximately 90 days after the date of sowing, plant productivity was monitored by measuring the number of tillers and the total seed weight per plant. Other productivity output parameters were measured including the number of filled grains per plant and the days for 85% maturity of the seed (starting from the date of sowing).

Comparative Example 5

A conventional soil cultivation set up was prepared in a greenhouse (at 28° C., 65% relative humidity) using germinated rice plants in pots with 4 kg of soil, as described in Comparative Example 3. Productivity parameters as described in example 4 were measured (same date of sowing and harvesting as Example 4). A comparison of the productivity parameters measured in Example 4 and Comparative Example 5 is shown in Table 2.

TABLE 2

Comparison of plant productivity

| Productivity metric | Average Number of Tillers | Average number of filled grain | Average seed weight g | Average days for 85% maturation |
|---|---|---|---|---|
| Example 4 | 29.2 | 3113.7 | 55.5 | 79 |
| Comparative example 5 | 22.0 | 2370.5 | 42.0 | 85 |
| % difference | 32.6 | 31.4 | 32.1 | −6 days |

Table 2 indicates an improved plant productivity in Example 4 compared to Comparative Example 5. Example 4 demonstrates a productivity increase of 32.6% with an earlier maturation by 6 days.

Comparative Example 6

A hydroponics set up was prepared in a greenhouse (at 28° C., 65% relative humidity) using a PVC pipe, as described in Comparative Example 2. A 1 HP motor was used to continuously circulate aerated water through the PVC pipe. Table 3 shows the power consumption comparison between Comparative Example 6 and Example 1.

TABLE 3

Comparison of power consumption

| Power Consumption | Motor Used | Power Consumption kWh/Day |
|---|---|---|
| Comparative Example 6 | 1 HP | 17.9 |
| Example 1 | 0 | 0 |

Clearly, the amount of power consumed is dramatically higher for a PVC pipe-based hydroponics system with continuous aeration, compared to a system without the need for power.

Prophetic Examples—Example 7, Comparative Example 8, & Example 9

The hydroponics set up from Example 1, Comparative Example 2, and Example 4 are separately and respectively prepared in Example 7, Comparative Example 8, and Example 9, except in each case, soil in the plant support structures is replaced with a soilless medium.

When comparing Example 7, Comparative Example 8, and Comparative Example 3, the examples demonstrate similar results (physical and biological parameters) to those indicated in Tables 1A and 1B for Example 1, Comparative Example 2, and Comparative Example 3. Water analysis of the examples shows that Example 7 has a lower turbidity, total suspended solids, total organic content, and total plate count (i.e., bacteria count) than Comparative Example 8 and Comparative Example 3. The dissolved oxygen levels in Example 7 are comparable to Comparative Example 8, even with no mechanical addition through aeration.

When comparing Example 9 to Comparative Example 5, the examples demonstrate similar results (plant productivity) to those indicated in Table 2 for Example 4 and Comparative Example 5. Example 9 shows improved plant productivity compared to Comparative Example 5. Example 9 also demonstrates a significant productivity increase with an earlier maturation when compared to Comparative Example 5.

When comparing Example 7 to Comparative Example 6, the examples demonstrate similar results (power consumption) to those indicated in Table 3 for Example 1 and Comparative Example 6. Comparative Example 6 shows that the amount of power consumed is dramatically higher than in Example 7.

CONCLUSION

The hydroponic system for growing plants as described herein therefore has many advantages in lowering energy costs, improved physical and biological parameters, improved productivity (e.g., earlier maturation of plants and increased yield per plant), lowered capital costs, lower maintenance costs, and an ability to cultivate more effectively. The ability to support oxygen requirements for roots in the presence of a constant water table can also be applied in many other applications such as aquaculture farming, plant irrigation, general architectural water bodies, etc.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, it should be appreciated that, while the invention has been described with reference to the above exemplary embodiments, other embodiments are within the scope of the claims. Moreover, it should be understood that the exemplary embodiments described herein may be combined to form other embodiments. After reading the above description, it will be apparent to one skilled in the relevant art(s) how to implement the invention in alternative embodiments. Thus, the present invention should not be limited by any of the above-described exemplary embodiments.

What is claimed as new and desired to be protected by Letters Patent of the United States is:

1. A hydroponic system comprising:
   one or more plant support structures that hold plant matter; wherein the one or more plant support structures have one or more holes;
   one or more housing membranes comprising nonwoven, woven, or knitted fabric or sheet that is air-permeable and water-resistant, house a solution and at least a portion of the one or more plant support structures, and have one or more openings into which at least a portion of the one or more plant support structures fit; and
   one or more frames that support the one or more housing membranes, wherein each frame borders one or more housing membranes, including along the sides of said one or more housing membranes, while allowing air to enter through said one or more housing membranes.
2. The system of claim 1, wherein the one or more plant support structures further comprise a soilless plant medium.

3. The system of claim 1, wherein the one or more plant support structures are connected to the one or more housing membranes or the one or more frames.

4. The system of claim 1, wherein the fabric or sheet of the one or more housing membranes comprises polyolefin.

5. The system of claim 4, wherein the polyolefin is polyethylene.

6. The system of claim 4, wherein the polyolefin is polypropylene.

7. The system of claim 1, wherein the fabric or sheet of the one or more housing membranes comprises nonwoven flash spun plexifilamentary sheet of polyethylene.

8. The system of claim 1, wherein at least one of the one or more housing membranes is one component.

9. The system of claim 1, wherein at least one of the one or more housing membranes has two or more components.

10. The system of claim 1, wherein the one or more housing membranes is at least 10 housing membranes.

11. The system of claim 1, wherein the fabric or sheet of the one or more housing membranes has a Gurley Hill porosity of from 1 to 100 seconds per 100 cc air.

12. The system of claim 11, wherein the fabric or sheet of the one or more housing membranes has a Gurley Hill porosity of from 10 to 50 seconds per 100 cc air.

13. The system of claim 1, wherein the fabric or sheet of the one or more housing membranes has a resistance to water penetration of from 50 to 1000 cm of $H_2O$.

14. The system of claim 13, wherein the fabric or sheet of the one or more housing membranes has a resistance to water penetration of from 100 to 500 cm of $H_2O$.

15. The system of claim 1, wherein the fabric or sheet of the one or more housing membranes has a total reflectivity of greater than 80%.

16. The system of claim 1, wherein the fabric or sheet of the one or more housing membranes has a moisture vapor transmission rate of from 400 to 3500 $g/m^2/day$.

17. The system of claim 16, wherein the fabric or sheet of the one or more housing membranes has a moisture vapor transmission rate of from 750 to 2000 $g/m^2/day$.

18. The system of claim 1, wherein the fabric or sheet of the one or more housing membranes has a maximum elongation of less than 40%.

19. A hydroponic system comprising:
one or more plant support structures for holding plant matter;
one or more housing membranes for housing a solution and at least a portion of the one or more plant support structures;
one or more frames for supporting the one or more housing membranes, wherein each frame borders one or more housing membranes, including along the sides of said one or more housing membranes, while allowing air to enter through said one or more housing membranes;
wherein the one or more plant support structures have one or more holes for allowing the solution to reach the plant matter inside of the one or more plant support structures or the roots of the plant matter to extend outside the one or more plant support structures into the housing membrane; and
wherein the one or more housing membranes comprises nonwoven, woven, or knitted fabric or sheet that is air-permeable and water-resistant, and have one or more openings for at least a portion of the one or more plant support structures to fit into.

20. A hydroponic system comprising:
one or more plant support structures that hold plant matter;
one or more housing membranes comprising nonwoven, woven, or knitted fabric or sheet that is air-permeable and water-resistant, house a solution and at least a portion of the one or more plant support structures, and have one or more openings into which a portion of the one or more plant support structures fits; and
one or more frames that support the one or more housing membranes, wherein each frame borders one or more housing membranes, including along the sides of said one or more housing membranes, while allowing air to enter through said one or more housing membranes;
wherein the one or more plant support structures comprise a soilless plant medium and have one or more holes in the sides or base of the one or more plant support structures;
wherein the one or more materials are polyolefin, and have a Gurley Hill porosity of from 1 to 100 seconds per 100 cc air, a resistance to water penetration of from 100 to 500 cm of $H_2O$, and a moisture vapor transmission rate of from 400 to 3500 $g/m^2/day$; and
wherein the solution comprises water and nutrients.

* * * * *